W. A. WILLIAMS.
VALVE FOR FLUSHING TANKS AND THE LIKE.
APPLICATION FILED AUG. 26, 1914.
1,129,533.
Patented Feb. 23, 1915.
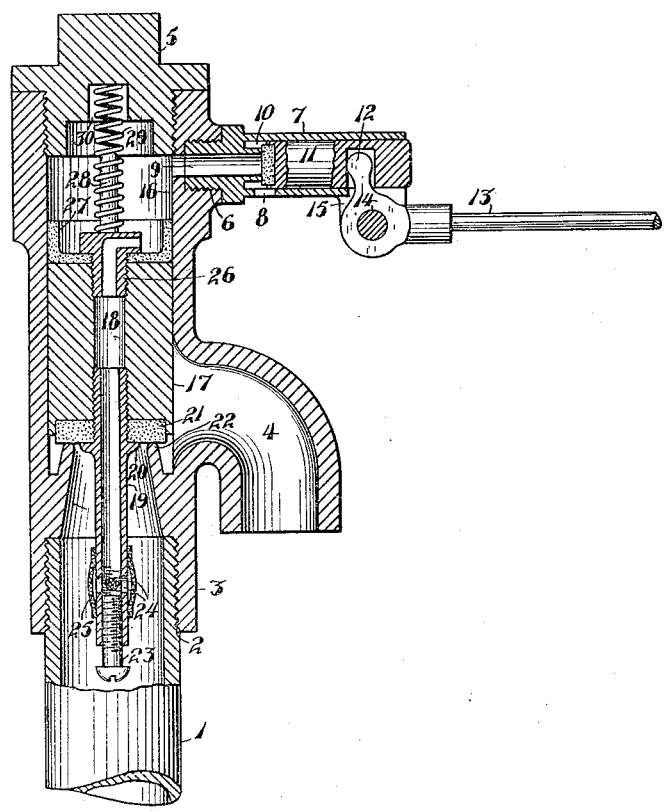
WITNESSES:
INVENTOR.
W. A. Williams
BY
ATTORNEY

UNITED STATES PATENT OFFICE.

WILLIAM A. WILLIAMS, OF SAN FRANCISCO, CALIFORNIA.

VALVE FOR FLUSHING-TANKS AND THE LIKE.

1,129,533.   Specification of Letters Patent.   Patented Feb. 23, 1915.

Application filed August 26, 1914. Serial No. 858,640.

*To all whom it may concern:*

Be it known that I, WILLIAM A. WILLIAMS, a citizen of the United States, residing at San Francisco, in the county of San Francisco and State of California, have invented new and useful Improvements in Valves for Flushing-Tanks and the like, of which the following is a specification.

The present invention relates to improvement in valves such as are used for controlling the supply of water to flushing tanks, and the object of the invention is to provide a valve of this character, for the operation of which only a very small float is required, which can be readily adjusted to operate under various pressures, which will be practically noiseless in operation, and which cannot readily get out of order.

In the accompanying drawing, the figure is a vertical section of my improved valve.

Referring to the drawing, 1 indicates a supply pipe, to the upper end of which is screwed, as shown at 2, a valve casing 3, having a spout 4, and closed at the top by a screw plug 5. In one side of said casing, above said spout, is screwed, as shown at 6, a float valve casing 7, having a discharge opening 8, and a central conduit 9, communicating with a conduit 10 in the valve casing 7. In said valve casing 7 can slide a valve 11 adapted to close the outer end of said conduit 9, and operated by an arm 12 of a lever 13, carrying a float, not shown, and pivoted, as shown at 14, on a lug 15 depending from the valve casing 7.

In the chamber 16 of the valve casing 3 can slide a piston valve 17 having an axially located conduit 18. Said conduit 18 communicates at its lower end with a tube 19, screwed thereinto, and having a flange 20, between which and the valve is compressed a gasket 21, normally resting upon a contracted seat 22 of the valve casing. Into the lower end of said tube 19 is screwed an adjusting screw 23, and, near the end of said screw, said tube is formed with holes 24. Surrounding said tube 19 and the holes 24 is a wire screen 25 secured at the top and bottom to said tube, but spaced therefrom in its middle portion, so that water passing inwardly through said screen can flow between said screen and the tube and can pass through said holes into the tube, then passing upwardly therethrough. Into the upper end of said conduit 18 is screwed a short tube 26, the bore of which is at the top extended laterally, and between the head of said tube and said valve is secured a cup-shaped washer 27 of leather or similar material. From the top of said short tube extends upwardly a guiding stem 28, around which is a coiled spring 29, the upper terminal portion of which is received in a cavity 30 in the screw plug 5.

The following is the mode of operation of the device: When the water is drawn from the tank, the float descends, and the float valve 11 is moved away from the outlet end of the conduit 9, thereby permitting water to flow from the upper end of the chamber 16 by the conduits 10 and 9 and discharge opening 8. By screwing up or unscrewing the screw 23, to regulate the size of the holes 24, the size of these holes can be made sufficiently less than the size 4 of the conduit 9 that the water can flow out of the conduit 9 faster than it flows through the holes 24 and thus there is sufficient upward pressure on the valve 17 to raise it against the pressure of the spring 29, and water then flows through the spout 4, filling the tank. Water continues to flow by reason of the pressure on the under side of the valve being greater than that on its upper side, until the tank is filled sufficiently to raise the float to close the float valve 11. Thereupon the pressure in the upper end of the valve chamber quickly rises, until it equals, or is greater than, the pressure below the valve, and the valve descends to its seat, shutting off the supply of water to the tank. By properly regulating the size of the holes 24, the valve can be caused to descend to its seat noiselessly. The screw admits of the valve being adjusted to pressures in the city main, which vary greatly.

The tube 19 is made sufficiently long that the holes 24 are at a considerable distance below the nozzle or contracted portion within the seat 22, so that the water can be operated on by its full static pressure to be forced through the holes 24.

The screen 25 forms an important feature of the invention, for it prevents the holes 24, which are very small, becoming clogged up wholly or partly. If partly clogged up, the size of these holes is correspondingly reduced and the operation of the device is changed accordingly. Any particles deposited on the outside of the screen are washed away by the quick flow of the water past said screen.

The utility of this invention may best be understood by comparing it with that disclosed in United States Letters Patent No. 826,001 granted to me July 17th, 1906. In said patent there was also disclosed a piston valve pressed to a seat by a spring and through which extended a conduit to furnish to the upper portion of the valve casing water under pressure to hold the valve down to its seat, said water being released by a valve actuated by a descending float. I found that the operation of this valve was not satisfactory for the following reason: When the piston valve was raised from its seat, the water flowing upwardly in the inlet pipe below said valve would immediately flow out through the discharge openings, so that the pressure at the lower end of the piston valve would be so low as not to furnish any pressure in the upper portion of the valve casing above said piston valve. Consequently it was necessary to use a very strong coiled spring for the purpose of returning the valve to its seat when the tank was filled. The use of such a strong coiled spring was objectionable, because it rendered the valve not sufficiently sensitive, so that it would not operate properly when the pressure was varied. When the pressure in a house was low, the valve could not be raised against the pressure of the spring and if it was high, the valve would not close against the water pressure. In my present invention I employ a spring only sufficiently light to overcome the friction between the valve and the valve casing so that the valve is operable under any water pressure. To accomplish this result, the inlet pipe is tapered up to the seat, the conduit is extended through the piston valve to a considerable distance below the seat, and the holes in said conduit are at such a depth below said seat as to be in a confined region in which there is still very considerable pressure even although the outlet to the tank be open, and thus the pressure above the piston valve is very nearly the same as the pressure below it. Consequently, since the area of pressure above the valve is greater than that below it, the valve is forced to its seat without the aid of spring force other than that sufficient to overcome friction.

I claim:—

In combination, a valve casing having supply and discharge apertures, a seat for a valve and a tapering inlet passage to said seat, a valve slidable in said casing having a conduit therethrough, a spring pressing said valve to its seat, a tube connected to said conduit and having in its side, below said tapering portion, a hole for the entrance of water into said tube, means for regulating the size of said hole, a filtering screen around said hole, said valve casing having an outlet from the end thereof remote from said tube, and a valve for controlling said outlet and adapted to be operated by a float.

In testimony whereof I have hereunto set my hand in the presence of two subscribing witnesses.

WILLIAM A. WILLIAMS.

Witnesses:
F. M. WRIGHT,
D. B. RICHARDS.

Copies of this patent may be obtained for five cents each, by addressing the "Commissioner of Patents, Washington, D. C."